United States Patent [19]
Hahn et al.

[11] 3,947,112
[45] Mar. 30, 1976

[54] DEVICE FOR DOCUMENT FILMING

[75] Inventors: Erich Hahn; Frank Reissig, both of Dresden, Germany

[73] Assignee: VEB Pentacon Dresden, Dresden, Germany

[22] Filed: June 24, 1974

[21] Appl. No.: 482,095

[30] Foreign Application Priority Data
Aug. 8, 1973 Germany............................ 172757

[52] U.S. Cl..................................... 355/68; 355/70
[51] Int. Cl.².................. G03B 27/74; G03B 27/76
[58] Field of Search .................. 355/38, 68, 37, 70; 356/227, 228

[56] References Cited
UNITED STATES PATENTS

| | | | |
|---|---|---|---|
| 2,201,606 | 5/1940 | Bing...................................... | 355/68 |
| 2,472,381 | 6/1949 | McMaster...................... | 356/228 X |
| 2,857,555 | 10/1958 | Koer et al....................... | 355/68 X |
| 3,402,636 | 9/1968 | Gemmer et al...................... | 355/68 |
| 3,606,552 | 9/1971 | Ambrosius.......................... | 356/227 |

FOREIGN PATENTS OR APPLICATIONS 386,847   1965   Switzerland........................... 355/70

Primary Examiner—L. T. Hix
Assistant Examiner—E. M. O'Connor
Attorney, Agent, or Firm—William A. Drucker

[57] ABSTRACT

A document photographing device has a surface for supporting a document to be photographed, a camera positioned about the surface, to receive light reflected from and transmitted by a document supported on the surface, and separate means for illuminating the document from above and below respectively. An exposure meter receives light reflected from or transmitted through the document and indicates when correct exposure conditions have been set. The exposure meter includes correction means for correcting the reading of the exposure meter to take account of the different spectral radiation characteristics of the illuminating means.

9 Claims, 5 Drawing Figures

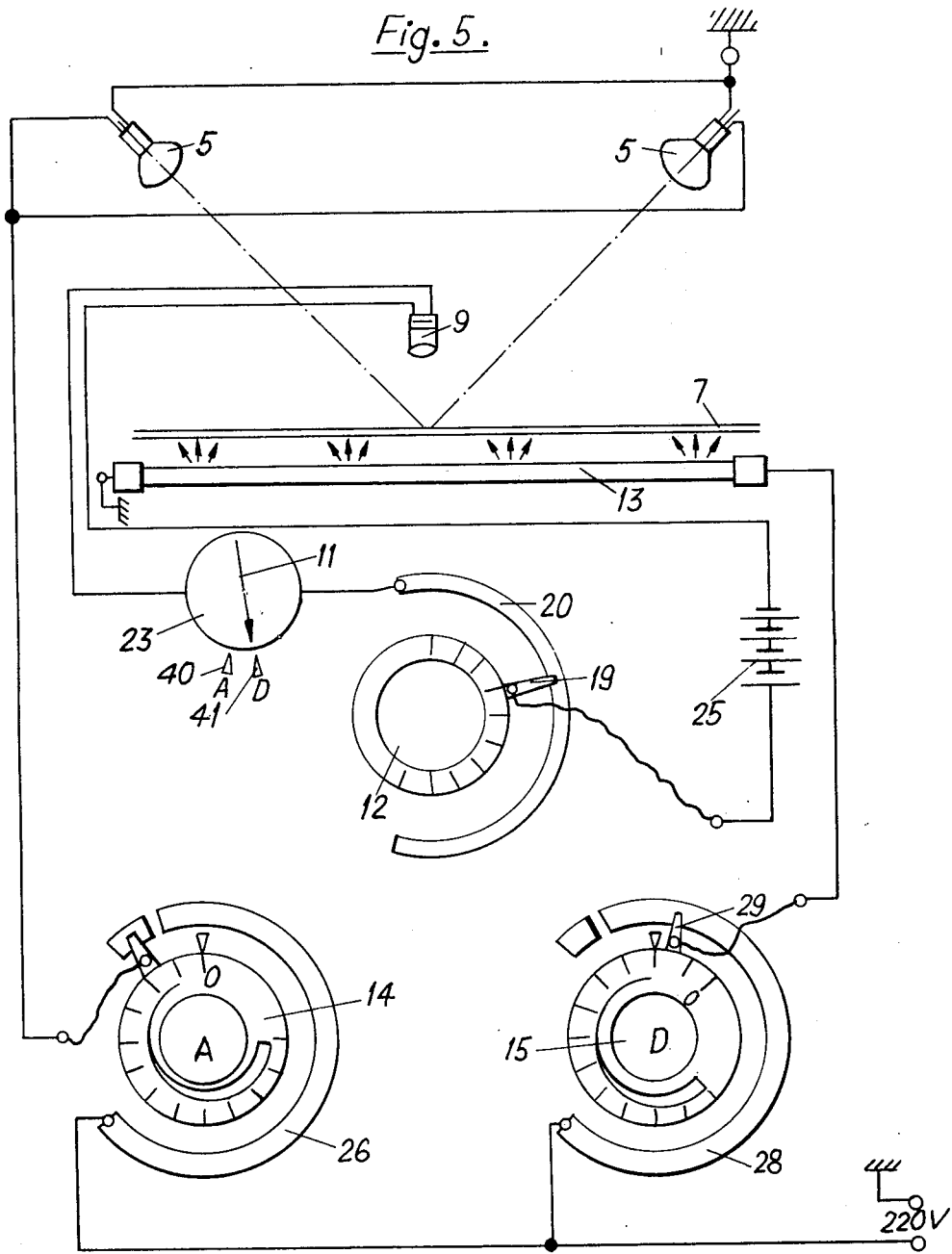

DEVICE FOR DOCUMENT FILMING

BACKGROUND TO THE INVENTION

The invention relates to a device for document filming with optional illumination of the original from above or below according to choice, light sources of different spectral radiation characteristics being provided for the two types of illumination.

Conventionally, illumination from above uses a source vertically above the original, the camera receiving light reflected from the original. Illumination from below causes the camera to receive light transmitted through the original.

For the filming of transparent originals it is usual to illuminate the original either from above or from beneath. If light sources of equal spectral radiation characteristics, for example incandescent lamps are used for the two types of illumination, the adaptation of the spectral sensitivity of a photo-receiver to the spectral sensitivity of the film can be achieved by simple arrangement of a colour filter. If on the other hand light sources of different spectral radiation characteristics are used, for example incandescent lamps for illumination from above and fluorescent tubes for illumination from below, then the spectral adaptation of the photo-receiver to the different radiation characteristics of the two light sources cannot be achieved to the requisite extent by the arrangement of a colour filter. Therefore the indication of the exposure meter will lead to different darkening of the film for illumination from above and compared with illumination from below.

The invention is based on the problem, in a camera of the initially stated kind, despite deviation in the spectral adaptation between film and photo-receiver, of obtaining an exposure indication which leads to equal darkening of the film in the case of different radiation characteristics of the light sources for illumination from above and illumination from below respectively.

SUMMARY OF THE INVENTION

According to the invention there is provided a device for photographing documents comprising:
 i. a surface for supporting a document to be photographed;
 ii. a camera positioned above said surface, to receive light reflected from and transmitted by a document when supported on said surface;
 iii. first illuminating means for illuminating from above a document when supported on said surface;
 iv. second illuminating means for illuminating from below a document when supported on said surface, having spectral radiation characteristics different from said first illuminating means;
 v. means for selecting between illumination from above and from below;
 vi. an exposure measuring device for receiving light reflected from or transmitted through a document when supported on said surface, and for indicating when correct exposure conditions have been set;
 vii. correction means for correcting the reading of the exposure meter to take account of said different spectral radiation characteristics of the first and second illuminating means.

According to a first embodiment the correction device comprises a damping resistor arranged in the measuring circuit, the electric value of which resistor corresponds to the measurement difference caused by the different spectral radiation characteristics of the two kinds of illumination, and which resistor can be connected or disconnected by a switch which is operable in the change from illumination from above to illumination from below or vice versa and lies electrically in parallel with the damping resistor. The damping resistor is preferably formed as a variable resistor. According to a further embodiment, where for the consideration of different kinds of film a rheostat is provided, the slider of the rheostat is adjustable according to a scale with values for different film sensitivities and the rheostat is made displaceable in relation to the slider by a switch cam operable in the change from illumination from above to illumination from below and vice versa, this relative displacement corresponding to the electric magnitude of the measurement difference caused by the different spectral radiation characteristics of the two kinds of illumination. According to another embodiment the correction device comprises a setting mark which is settable in relation to the setting member for the film sensitivities, the setting mark being arranged on a movably mounted mark plate which is movable into mutually different positions in the case of illumination from above and illumination from below. The adjustable parts of the correction devices are expediently operable in dependence upon a switch knob for the one or the other type of illumination. According to an especially simple embodiment the setting knob which is settable according to the measure of a scale with values for different film sensitivities has setting marks arranged with spacing from one another which are provided with symbols for illumination from above and illumination from below, and this spacing corresponds to the measurement difference which is caused by the different spectral radiation characteristics of the two types of illumination.

BRIEF DESCRIPTION OF THE DRAWINGS

The invention is explained by reference to illustrated and described examples of embodiment.

FIG. 5 shows a correction device with separate measurement marks for each kind of illumination.

DESCRIPTION OF PREFERRED EMBODIMENTS

Figure 1:
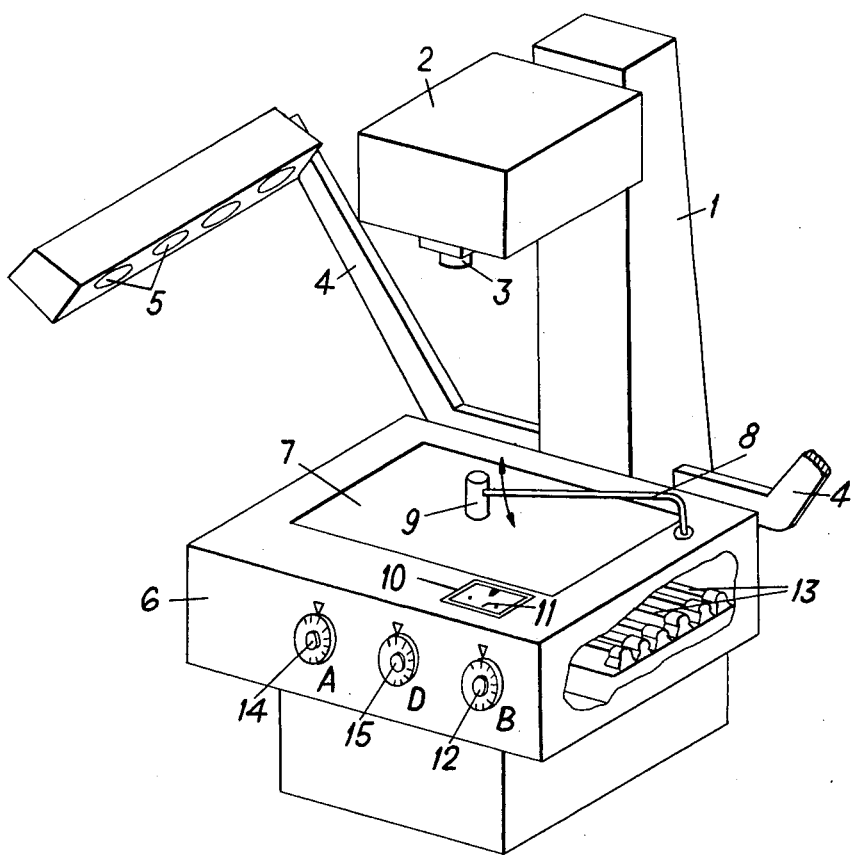
FIG. 1 shows a device for document filming.

The device for the micro-filming of documents (see FIG. 1) consists essentially of a camera 2 secured on a stand 1, and having a picture-taking lens 3, lateral lamp carriers 4 with incandescent lamps 5 for vertical illumination and an object table 6. A supporting surface or object holder is formed by the ground glass pane 7. The photo-receiver 9 of an exposure measuring device is secured on a pivot arm 8. A pointer 11 of an exposure meter forming a part of the exposure measuring device is visible in a viewing window 10. The exposure meter is influenceable by means of a setting knob 12. Beneath the ground glass pane 7 fluorescent tubes 13 are arranged with different spacings from one another; the spacing of the outer fluorescent tubes 13 being smaller than the spacing of the middle fluorescent tubes. A switch knob 14 serves for switching on and regulating the brightness of the incandescent lamps 5 and a switch knob 15 serves for switching on and regulating the brightness of the fluorescent tubes 13.

Figure 2:
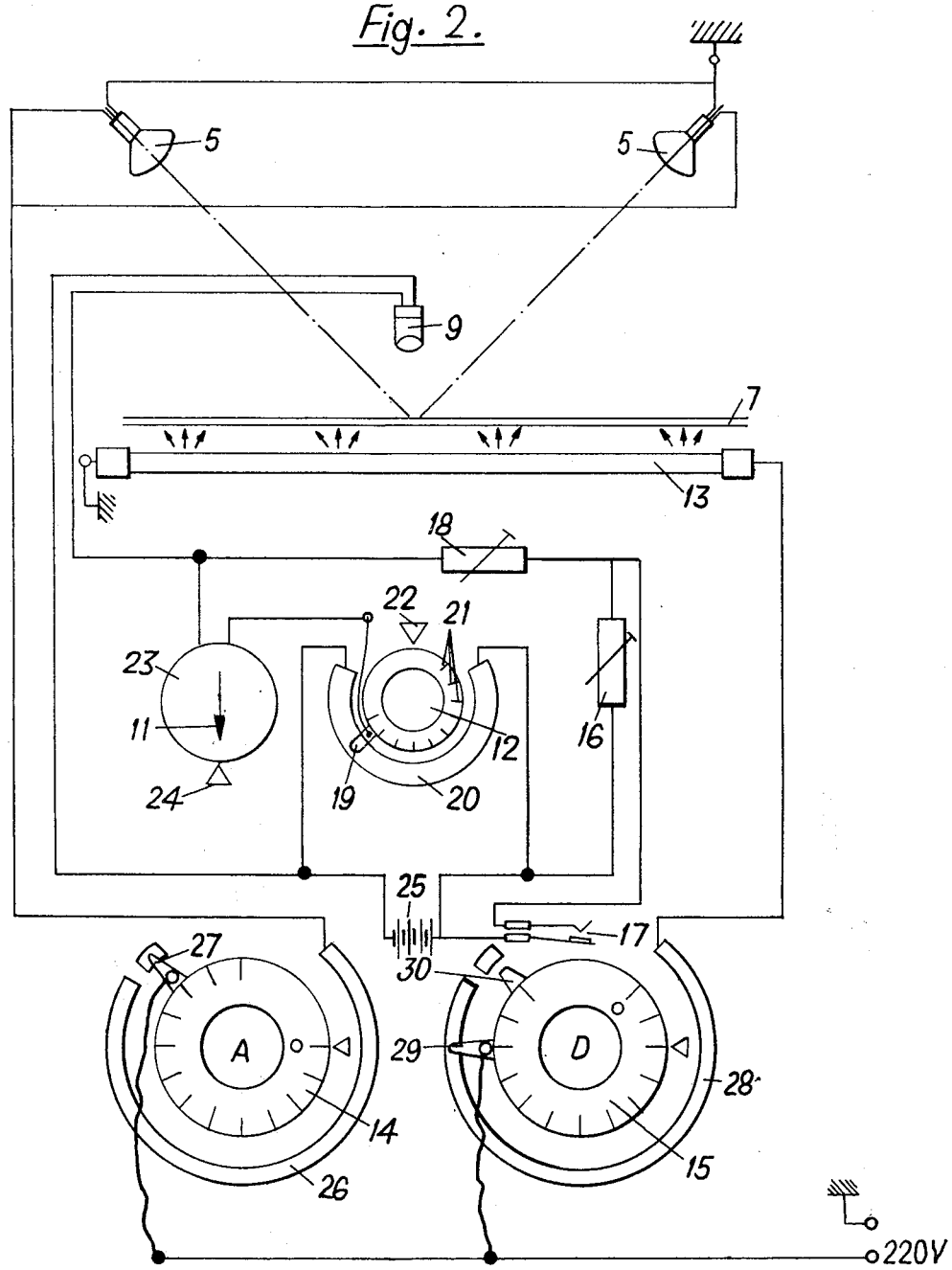
FIG. 2 shows a correction device with variable damping resistor.

In the embodiment of the correction device with variable damping resistor 16 (see FIG. 2) a switch is provided which is arranged electrically in parallel with the damping resistor 16; the damping resistor 16 can be shorted out by closure of this switch 17. The exposure meter is assembled according to this embodiment as a bridge circuit. The photoreceiver 9 and an adjusting resistor 18 lie each in one branch of the bridge, while the other two branches of the bridge are formed by a rheostat 20 which can be divided by slider 19. The slider 19 is firmly connected with the setting member 12 which is settable by means of a scale 21 with values for different film sensitivities in relation to a setting mark 22. A current meter 23, the pointer 11 of which swings in relation to a measuring mark 24, lies in the diagonal branch of the bridge circuit. The exposure meter circuit is fed by a current source 25. In the current circuit of the incandescent lamps 5 a rheostat 26 is arranged which is scannable by a slider 27 of the switch knob 14 for varying the illumination from above. In the current circuit of the fluorescent tubes 13 a rheostat 28 is arranged which is scannable by a slider 29 of the switch knob 15 for varying the illumination from below. The two switch knobs 14 and 15 are operable either separately or simultaneously in the direction of switching on of the incandescent lamps 5 and the fluorescent tubes 13 respectively. The switch knob 15 for illumination from below possesses a switch cam 30 by which the switch 17 is closable when the fluorescent tubes 13 are switched off.

The manner of operation of this embodiment is as follows:-

The sensitivity of the film material inserted into the camera 2 is taken into account by rotation of the setting member 12. Then a transparent document is placed upon the ground glass pane 7, so that it is possible to work with illumination from below. For this purpose the switch knob 14 for the incandescent lamps 5 is in the switched-off position. The fluorescent tubes 13 have been switched on by the switch knob 15. The switch cam 30 has then caused the switch 17 to open, so that the damping resistor 16 is effective in addition to the adjusting resistor 18 in one bridge branch. By means of the pivot arm 8 the photo-receiver 9 is pivoted over the position of the document to be measured. By rotation of the switch knob 15 the brightness of the fluorescent tubes 13 is varied until the meter pointer 11 stands opposite the measuring mark 24. Thus the brightness of the fluorescent tubes 13 is adjusted, which together with the constant exposure time delivered by the shutter of the camera 2 produces a correctly exposed photograph.

If on the other hand a document is to be illuminated from above, that is by the incandescent lamps 5, then the switch knob 15 for transillumination is brought into the position marked as "zero" and the incandescent lamps 5 are switched on by the switch knob 14 for illumination from above. When the switch knob 15 is in the position marked as "zero" the switch 17 is held in the closed position by the switch cam 30 so that the damping resistor 16 is shorted out. By rotation of the switch knob 14 the correct brightness of the incandescent lamps 5 is set when again the meter pointer 11 stands opposite to the measuring mark 24.

Figure 3:
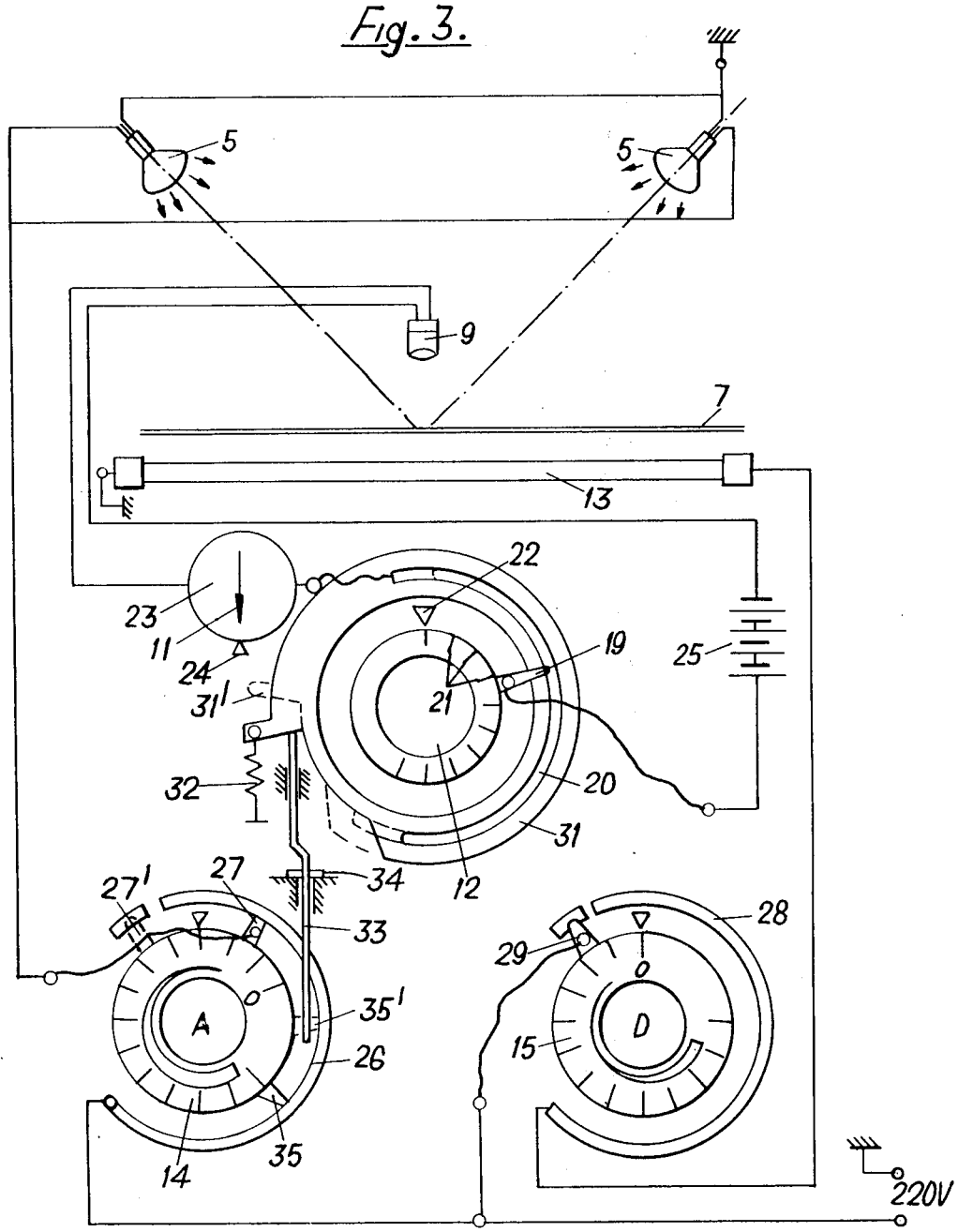
FIG. 3 shows a correction device with rheostat for the consideration of different kinds of films.

In the embodiment according to FIG. 3 the resistor 20, which can be tapped by the slider 19 of the setting knob 12 for the consideration of different film sensitivities, is made displaceable. For this purpose the resistor 20 is arranged on a resistance plate 31 which is mounted rotatably concentrically with the setting knob 12. The resistance plate 31 is constantly held in engagement in the counter-clockwise direction with a coupling rod 33 by a return spring 32. The coupling rod 33 is held in the end position intended for illumination from above by the stop 34. Thus when the coupling rod 33 is in this end position the resistance plate 31 is also situated in the position for illumination from above. The switch knob 14 for illumination from above, that is for the switching on and regulation of the incandescent lamps 5, is provided with a switch arm 35 for the coupling rod 33. On rotation of the switch knob 14 into the switched-off position 27' or 35' the resistance plate 31 is rotated by means of the coupling rod 33 against the return spring 32 into the position 31' indicated in broken lines, which is intended for illumination from below. The correct brightness of the incandescent lamps 5 or of the fluorescent tubes 13 is set in each case when the meter pointer 11 stands opposite to the measuring mark 24.

Figure 4:
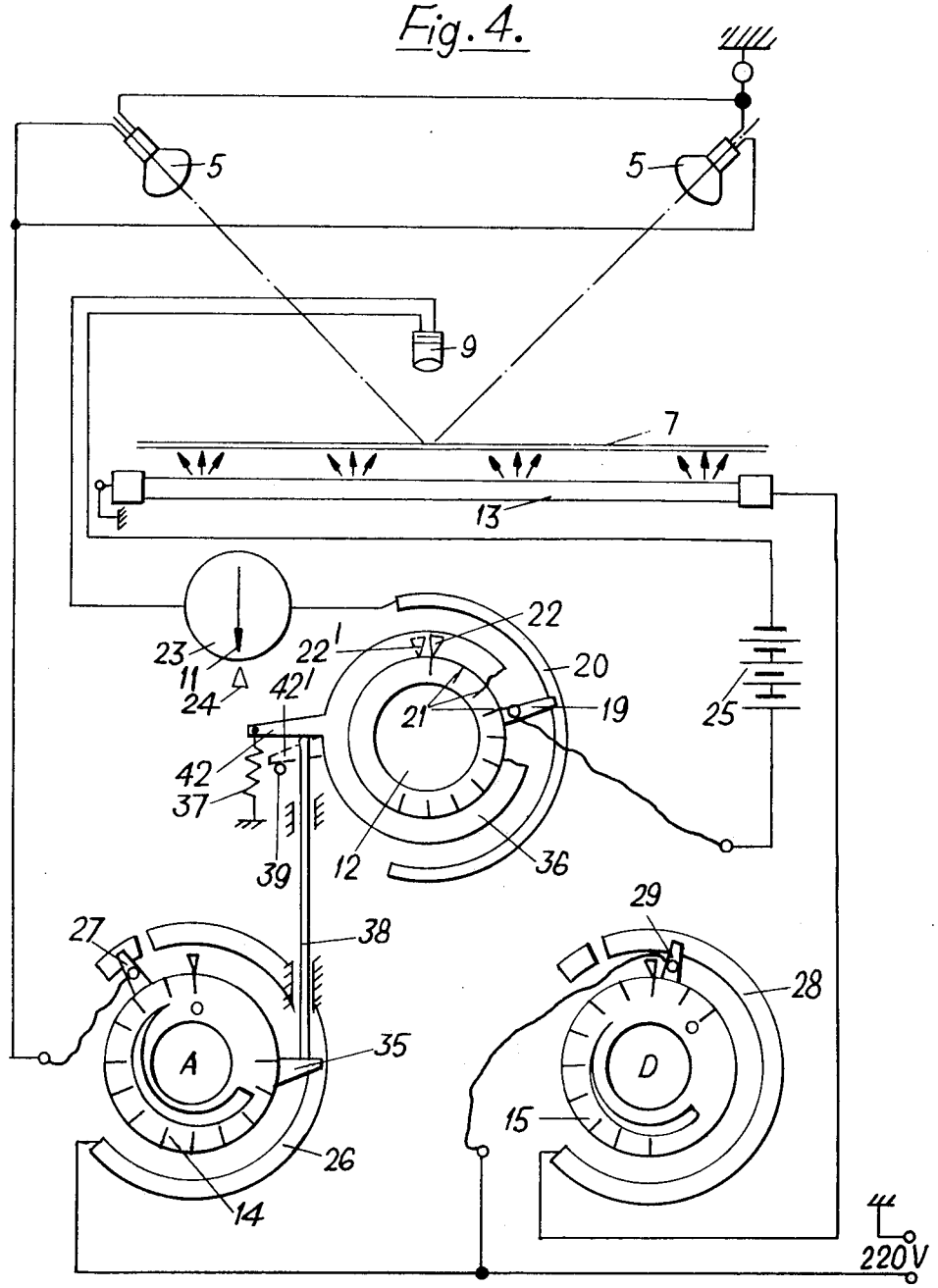
FIG. 4 shows a correction device with adjustable measurement mark.

In the embodiment according to FIG. 4 the setting mark 22, with which the scale 21 for the consideration of different film sensitivities corresponds, is arranged on a mark plate 36 which is mounted rotatably concentrically with the setting member 12. The mark plate 36 is provided with an arm 42 constantly held in engagement with a coupling rod 38 by a return spring 37 in the counterclockwise direction. The mark plate 36 is held in the end position intended for illumination from above by a stop pin 39. The coupling rod 38 can be displaced axially by the switch arm 35 of the switch knob 14 for illumination from above.

When the switch knob 14 is in the switched-off position (see FIG. 4) the mark plate 36 is situated in the position intended for illumination from below. On rotation of the switch knob 14 in the direction of switching on of the incandescent lamps 5 the return spring 37 can rotate the mark plate 36 as far as the stop pin 39 moving arm 42 into the position 42'. This position of the mark plate 36 corresponds to the position of the setting mark 22' intended for illumination from above.

In the embodiment according to FIG. 5 the adaptation of the exposure meter to the different spectral radiation characteristics of the incandescent lamps 5 and of the fluorescent tubes 13 is achieved by two measuring marks 40 and 41 arranged with spacing from one another. When illumination from above is used the switch knob 14 should be rotated until the meter pointer 11 stands opposite to the measuring mark 40, while with the switch knob 15 the correct brightness of the fluorescent tubes 13 is set when the meter pointer 11 stands opposite to the measuring mark 41. Although not shown in FIG. 5, in this embodiment the setting knob 12 includes a setting mark similar to the mark 22 shown in FIG. 2.

The invention is not limited to the embodiments as illustrated and described. Of course it is also conceivable to produce a correction device using interchangeable filters with different spectral permeabilities or otherwise.

We claim:

1. A device for photographing documents comprising:

i. a surface for supporting a document to be photographed;

ii. a camera positioned above said surface, to receive light reflected from and transmitted by a document when supported on said surface;
iii. first illumination means for illuminating from above a document when supported on said surface;
iv. second illuminating means for illuminating from below a document when supported on said surface, having spectral radiation characteristics different from said first illuminating means;
v. means for selecting between illumination from above and from below;
vi. an exposure measuring device for receiving light reflected from or transmitted through a document when supported on said surface, and for indicating when correct exposure conditions have been set;
vii. correction means for correcting the reading of the exposure meter to take account of said different spectral radiation characteristics of the first and second illuminating means.

2. Device according to claim 1, wherein said exposure measuring device includes a measuring circuit, and said correction device comprises a damping resistor arranged in the measuring circuit, the electric value of which damping resistor corresponds to the electric value of the measurement difference caused by said different spectral radiation characteristics and which damping resistor can be connected and disconnected by a switch lying electrically in parallel with the damping resistor and to be operated in the change between said illumination from above and from below.

3. Device according to claim 2, wherein the damping resistor is formed as a variable resistor.

4. Device according to claim 3, wherein said means for selecting between illumination from above and from below includes a switch having a part which cooperates with the switch for connecting and disconnecting the damping resistor upon changing between illumination from above and from below.

5. Device according to claim 1, wherein said exposure measuring device includes a measuring circuit having a rheostat for the introduction of different film sensitivities, the rheostat having a slider, a scale attached to said slider and a setting mark against which said scale is settable, the scale having indications indicative of different film sensitivities.

6. Device according to claim 5, wherein the rheostat is displaceable relative to the slider and said means for selecting between illumination from above and from below includes a switch having a switch cam which cooperates with said displaceable rheostat to displace the latter upon changing between illumination from above and below, this relative displacement corresponding to the electric value of the measurement difference caused by said different spectral radiation characteristics.

7. Device according to claim 5, wherein the setting mark is arranged on a movably mounted plate which is movable upon changing between illumination from above and below, the range of this movement corresponding to the electric value of the measurement difference caused by said different spectral radiation characteristics.

8. Device according to claim 7, wherein said means for selecting between illumination from above and from below includes a switch having a part which cooperates with said movably mounted plate to move the latter upon changing between illumination from above and from below.

9. Device according to claim 5, wherein the measuring circuit includes a current meter having a pointer which swings in relation to two measuring marks, alignment of the pointer with one of said marks being indicative of correct exposure settings when illumination from above is used, alignment of the pointer with the other of said marks being indicative of correct exposure when illumination from below is used, the distance between said marks corresponding to the electric value of the measurement difference caused by said different spectral radiation characteristics.

* * * * *